United States Patent
Midkiff

(10) Patent No.: US 7,785,423 B1
(45) Date of Patent: Aug. 31, 2010

(54) METHOD AND APPARATUS FOR CLEANING THE PROPULSION MEANS OF VEHICLES

(76) Inventor: David G. Midkiff, 8402 Professional Hill Dr., Fairfax, VA (US) 22031

( * ) Notice: Subject to any disclaimer, the term of this patent is extended or adjusted under 35 U.S.C. 154(b) by 95 days.

(21) Appl. No.: 11/978,394

(22) Filed: Oct. 30, 2007

(51) Int. Cl.
*B08B 1/02* (2006.01)
(52) U.S. Cl. .............................. 134/32; 134/33; 134/34; 134/42; 134/123
(58) Field of Classification Search ............ 134/34, 134/42, 104.1, 123, 135, 32, 33
See application file for complete search history.

(56) References Cited

U.S. PATENT DOCUMENTS

| | | | | |
|---|---|---|---|---|
| 1,694,197 | A | * | 12/1928 | Woodling ..................... 134/45 |
| 2,764,260 | A | * | 9/1956 | Fleischman ................. 188/381 |
| 4,917,125 | A | * | 4/1990 | Midkiff ...................... 134/123 |

* cited by examiner

*Primary Examiner*—Michael Kornakov
*Assistant Examiner*—Naomi Birbach
(74) *Attorney, Agent, or Firm*—Law Firm of Walter D. Ames

(57) ABSTRACT

A method and apparatus for removing debris from the propulsion system of a vehicle such as a battle tank, including a tank in which the vehicle is positioned, means for lifting the vehicle in the tank, and means to wash the vehicle's propulsion system while the vehicle is in raised position.

9 Claims, 1 Drawing Sheet

METHOD AND APPARATUS FOR CLEANING THE PROPULSION MEANS OF VEHICLES

BACKGROUND OF THE INVENTION

1. Field of the Invention

The present invention relates generally to methods and apparatus for washing the wheels and other propulsion means of vehicles. More specifically, it relates to such apparatus and the methods they perform for removing mud and debris from the wheels and tires of heavy duty trucks, battle tanks and like equipment to maintain the level of their functionality.

2. Description of Prior Art

A series of patents that have issued in my name as inventor are probably representative of the prior art so far as it relates to washing the wheels and tires of vehicles. Most recently, U.S. Pat. No. 6,895,978 issued on May 24, 2005 and is entitled, Apparatus for Washing Vehicle Tires and Wheels. That patent discloses a washing system in which, as is common to many of my inventions, an elongated tank is employed with ramps at either or both ends by means of which the vehicle, often a truck, can enter and exit. In this patent a secondary tank is located parallel to and contiguous with the primary tank so that, at the washing station of the primary tank where a liquid spray is directed against the vehicle wheels and tires, the debris from the vehicle can be washed from the primary to the secondary tank, from which it is ultimately withdrawn. In this manner the primary tank or trough is kept free of debris at the washing station.

Still another patent in my name is U.S. Pat. No. 6,561,201, issued May 13, 2003, which discloses apparatus including an elongated trough the bottom of which is formed from angle irons at the washing station. Spray means are mounted within the angle iron to eject liquid against the wheels and tires of a vehicle as it passes over the angle irons. Also generally relevant as background art are my U.S. Pat. Nos. 5,730,164, issued May 24, 1998, and 4,917,125, issued Apr. 17, 1990.

While the disclosures of these patents all serve their intended purpose, a problem may arise in the washing of the propulsion means of specialized types of vehicles. Thus, owing to the type and placement of the propulsion means, it may be difficult for a liquid spray to reach all areas of propulsion means that may carry mud and debris. For example, in a vehicle where the propulsion means are multiple, closely spaced wheels, a forward wheels and its tire may block the flow of spray to the closely adjacent, rearward wheel. Where it is a battle tank to be washed, areas of the endless track or tread may well be almost inaccessible to a spray of liquid cleaning fluid.

It is, therefore, a primary object of the present invention to provide an apparatus and associated method for washing the propulsion means of a vehicle that will be particularly effective in accomplishing that purpose, particularly where the propulsion means is challenging insofar as washing it is concerned.

It is another object of my invention to provide such an apparatus and method that is particularly adapted to provide effective washing of the propulsion means of a specialized vehicle, such as a battle tank or halftrack.

SUMMARY OF THE INVENTION

In its apparatus form my invention basically includes an elongated tank having the usual side walls and bottom, together with end walls which, when open, permit ingress and egress of a vehicle having propulsion means. At least at a washing station within the tank or trough, a cleaning liquid is maintained in the form of a bath. Lifting means is provided for moving the vehicle between a lowered position in which the propulsion means is in contact with the bottom of the tank, and raised position in which the vehicle propulsion means is in a position above and out of contact with the bottom. Further, there is means for washing the vehicle while its propulsion means is out of contact with the bottom of the tank or trough. As stated, such propulsion means can be wheels, tracks or treads, or a combination thereof. The washing means can be the liquid bath which reaches to the level of the propulsion means or a series of spray heads that direct liquid at the propulsion means in its raised position, and the propulsion means must be such as can be operated while the vehicle is in raised position.

In the method form of the invention, the same apparatus, that is, an elongated trough with a bottom, side and end walls is provided. The vehicle is moved into the trough past one of the end walls, and both end walls are either in or moved to closed position. The vehicle is then raised to a position in which its propulsion means is out-of-contact with the trough bottom and washed in that position, after which it is lowered and, with its propulsion means in contact with the trough bottom, driven out of the tank through either end thereof.

In one feature of my invention, a liquid bath of cleaning fluid is located in the trough at the washing station. When the tank or other vehicle is raised while in the trough, it is only raised to a position in which at least a portion of the propulsion means is still in contact with the cleaning bath. In such suspended position the propulsion means of the vehicle is actuated so that the wheels or track move to agitate the bath and bring all portions of the propulsion means into contact with the bath, thereby ensuring a thorough wash of that propulsion means. If desired, spray heads can also be utilized in conjunction with the bath to make certain that a complete cleaning of the propulsion means is effected. When the vehicle in operation is an army battle tank, in this manner the entirety of the endless tread of the tank, with all of its linkages, will be brought into contact with the cleaning bath and, when such cleaning has been completed, the tank can be lowered to a contact position on the bottom of the elongated trough, the liquid bath drained from the washing station of the trough, and the tank permitted egress past either of the now open end walls of the trough.

These and other objects, features and advantages of the present invention will become more apparent when considered in conjunction with a detailed description of a preferred embodiment of my invention as written in conjunction with the annexed drawing, in which:

BRIEF DESCRIPTION OF DRAWING

The sole FIGURE.

DETAILED DESCRIPTION OF PREFERRED EMBODIMENT

Figure 1:
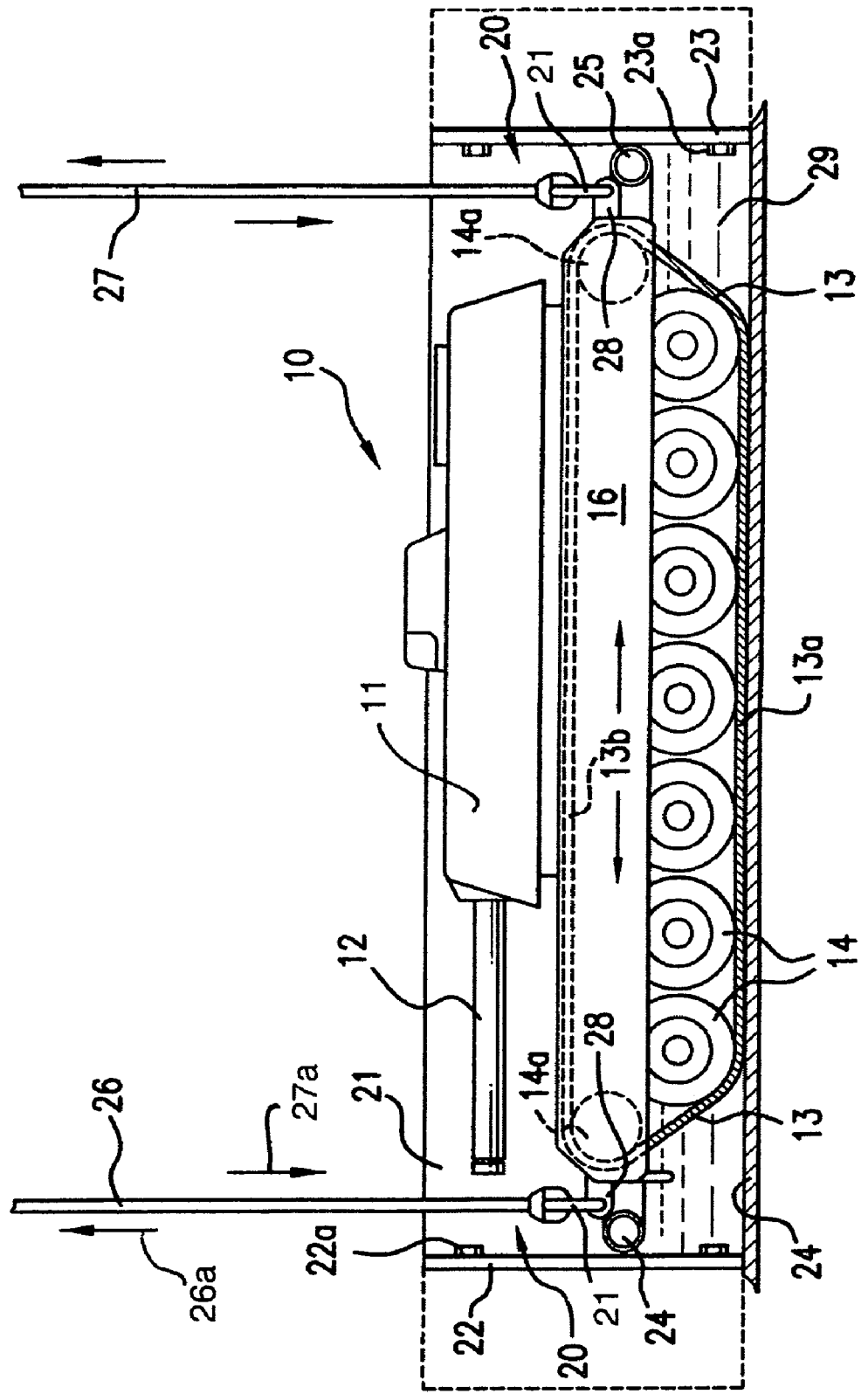
FIG. 1, illustrates the invention with a battle tank in position in a trough ready to be raised to a position in which washing can commence, one side wall of the trough having been removed for the purpose of clarity.

Referring now to FIG. 1 of the drawings, what is there illustrated is a battle tank, referenced by numeral 10, which conforms generally to the outline of an Abrams tank that entered into service of the U.S. Army in 1980. The Abrams tank is intended to destroy enemy forces on a battlefield using mobility, firepower and shock effect. The tank shown in FIG. 1 is characterized by a pivotable fire tower 11 carrying a gun 12 of substantial fire power, and is propelled by an endless track or tread 13 trained about a series of wheels 14 that are aligned with axes substantially parallel to the terrain over which the tank will travel.

Propulsion wheels 14 do not contact the ground or other base surface, but cause tread or track 13 to move in at least one substantially horizontal, base or lower flight 13a that does contact the base surface. Base flight 13a finds its counterpart in upper, horizontal flight 13b, obscured in FIG. 1, which extends generally parallel to the base flight. Guide wheels 14a are used to train the track 13 to proceed from one flight to the other. Also seen in FIG. 1 is a shroud 16 that serves to protect the tread 13 in its upper flight 13b as that flight does not contact the base surface and thus performs no immediate function other than maintaining the track in position for its descent into the base flight 13a where it will serve to contact the base surface and propel the tank over it.

As illustrated in FIG. 1, the battle tank 10 is positioned within an elongated trough generally indicated by arrow 20. The trough or tank 20 has side walls 21, of which only one is seen, end walls 22 and 23, and a bottom 24. The end walls 22 and 23 are movable between open and closed positions, as by the hinges 22a and 23a of the drawing. In such closed positions they seal the cleaning station of the tank against the outflow of liquid from either end of the cleaning station at which the tank is shown as being located. Such liquid, indicated by reference numeral 29, may be introduced into the elongated tank or trough at the cleaning station by conventional means, such as the supply pipes 24 and 25. Removal of the liquid from the tank cleaning station is accomplished by a drain, not shown, by suction, or by other conventional means.

An important feature of the present invention is illustrated in FIG. 1. Lifting means, such as a hydraulic lift, is provided at the cleaning station of the trough, such means being diagrammatically indicated by straps 26 and 27 that can move in unison upwardly or downwardly in the direction of the arrows 26a and 27a. Attachment means in the form of eye bolts 28 are formed integrally with the battle tank at four corners thereof, and the lifting means, which is shown as metal straps terminating downwardly in hooks 21, which fit into the eye bolts 28 and lift the battle tank up and down at the washing station between the trough end walls 22 and 23. In such raised position the battle tank will have its propulsion means placed into operation.

The apparatus illustrated in FIG. 1 may be used to carry out the entirety of the method of my invention. In that method as set forth in this preferred embodiment, first the tank, with accumulated grime and debris, is driven into the elongated tank or trough 20 by a conventional entrance ramp located at one end of the trough. The battle tank 13 uses its propulsion means to bring it to the cleaning station at which it is illustrated in FIG. 1. The end walls 22 and 23 of the trough 20 are then closed by pivoting on hinges 22a and 23a so that the cleaning station is essentially water-tight. A cleaning fluid 29 is then either already present at least in part at the cleaning station or is introduced though supply pipes 24 and 25 until the level of liquid at the cleaning station has reached a level such that the continuous track 13 is covered with fluid. As seen in FIG. 1, the level would be such that, at rest, the level approaches that of the shroud 16 of the tank 10 when the tank is located at the bottom 24 of the trough 20.

After or even during the addition of cleaning fluid to the trough the battle tank is raised by hydraulic means indicated diagrammatically by cables or straps 26 and 27 that terminate in hooks 29 that are releasably inserted in eyebolts 28 integral with or firmly fixed to the body of the battle tank. It will be obvious that in order to maintain the tank in an upright, substantially horizontal position as it is being lifted, there will be double the number of straps and eyebolts shown in FIG. 1, i.e., there will be eyebolts at all four corners of the body of the battle tank cooperating with straps terminating in hooks. With the tank in raised position in which its continuous tread or track 13, or at least the lower flight 13a thereof is immersed in the cleaning fluid, the propulsion means of the battle tank is actuated so that wheels 14 rotate to impart motion to the tread 13. Of course, in raised position the track 13 does not propel the battle tank forward; that tank maintains its position in the trough as the tread moves. However, by such motion all parts of the tread are brought into vigorous contact with the cleaning fluid, as are the wheels 14. The washing effect is far superior to a simple wash by standing in water or being subjected to spraying.

Although not illustrated in detail, spray heads may be positioned at the side wall of the trough as well as at the bottom of the tank to direct cleaning fluid at the battle tank while it is in a raised position in which the flights 13a ands 13b of the track are exposed, as are the shrouds 16. However, regardless of whether spraying is utilized to enhance the cleaning of the battle tank in raised position, it is the rotation of the wheels 14 that give motion to the endless tread 13 that cause the agitation that brings the fluid into contact with all portions of the tread, thereby forcibly removing dirt, grime and debris that may be entrapped between couplings of the track and between the track and the shrouds that protect upper flights 13b.

With regard to the cleaning fluid, itself, it is usually water, but detergents and other cleaning agents may be added to the water should the need arise. With respect to the vehicle that is being cleaned, as presently contemplated that it is especially applicable to the washing of battle tanks or halftracks whose endless tread is particularly subject to entraining debris, rocks and other foreign materials that impede the proper function of those parts if not removed. However, my invention is also applicable to washing automobiles, trucks, and other heavy duty vehicles that cannot be properly cleaned while their propulsion means is at rest.

Thus, it will be apparent to those of skill in this art that alterations and modifications may be made in the specific, preferred embodiment illustrated and described hereinbefore without basically departing from the spirit of my invention. As to all such alterations and modifications, it is desired that they be included within the purview of the invention, which is to be limited only by the scope, including equivalents, of the following, appended claims.

I claim:

1. A method for removing debris from and washing the propulsion means of a vehicle, such propulsion means comprising wheels, tracks or treads that contact and move the vehicle over the ground, comprising:

providing an elongated tank having spaced, opposed side walls, a bottom and end walls, each of said end walls being movable between open positions in which said vehicle can access or exit said tank and closed positions in which said tank is substantially sealed with said vehicle maintained within said tank, opening one of said end walls, moving said vehicle into said tank past said one open end wall to a position in which said vehicle propulsion means rests on said tank bottom and said vehicle is supported solely by said tank bottom, closing said one end wall, lifting said vehicle in said tank to a position in which the entirety of said propulsion means is out of contact with said tank bottom, washing said propulsion means while said vehicle is in said raised position, lowering said vehicle until said propulsion means is in contact with said tank bottom, and propelling said vehicle from said tank.

2. A method as claimed in claim 1, in which said propulsion means is washed in said raised position by spraying fluid against said propulsion means.

3. A method as claimed in claim 1, in which said propulsion means is washed in said raised position by at least partially immersing said propulsion means in a liquid bath located in said tank.

4. A method for removing debris from and washing the propulsion means of a vehicle, such propulsion means comprising wheels, tracks or treads that contact the ground and rotate to move the vehicle over the ground, comprising:

providing an elongated tank having spaced, opposed side walls, end walls, and a bottom that meets said walls and forms an enclosure for maintaining a cleaning liquid therein, positioning a level of cleaning liquid within said tank, moving said vehicle into said tank until said vehicle propulsion means rests on said tank bottom and said vehicle is supported solely by said tank bottom, positioning a level of cleaning liquid within said tank, lifting said vehicle in said tank to a position in which the entirety of said propulsion means is out of contact with said tank bottom but at least a portion thereof is in contact with said cleaning liquid, operating said propulsion means while said vehicle is in said raised position to effect cleaning of said propulsion means, discontinuing operation of said propulsion means, lowering said vehicle until said propulsion means contacts and is supported by the bottom of said tank, and removing said vehicle from said tank.

5. A method as claimed in claim 4, in which said vehicle is driven into and out of said tank by said propulsion means.

6. A method as claimed in claim 4, including the additional step of spraying cleaning fluid at said propulsion means during the operation thereof in said tank.

7. A method as claimed in claim 4, in which said propulsion means includes an endless tread.

8. A method as claimed in claim 7, in which said vehicle is an army battle tank.

9. A method as claimed in claim 4, in which cleaning liquid is drained from said tank immediately prior to removing said vehicle from said tank.

\* \* \* \* \*